Jan. 2, 1940.  L. F. SORG ET AL  2,185,741
HOSE ATTACHMENT
Filed July 5, 1938
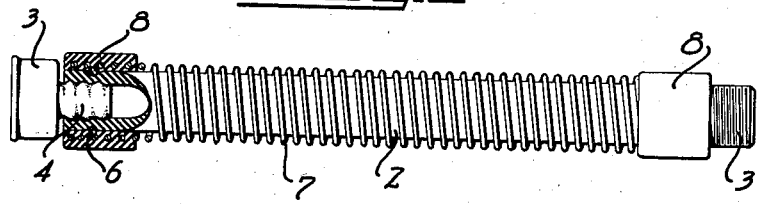
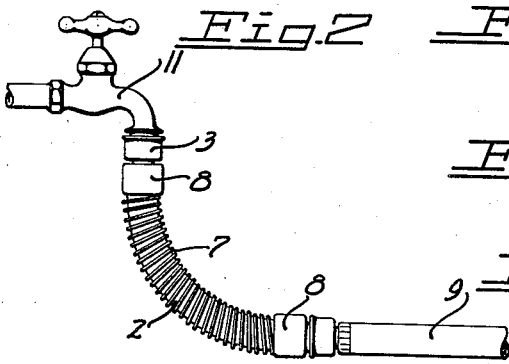
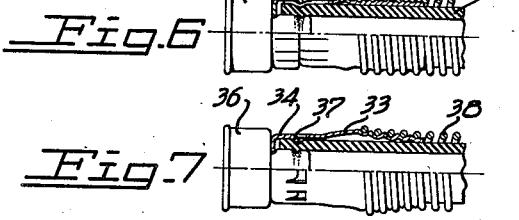
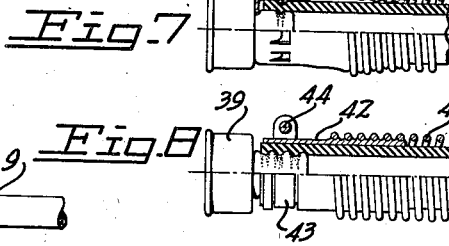
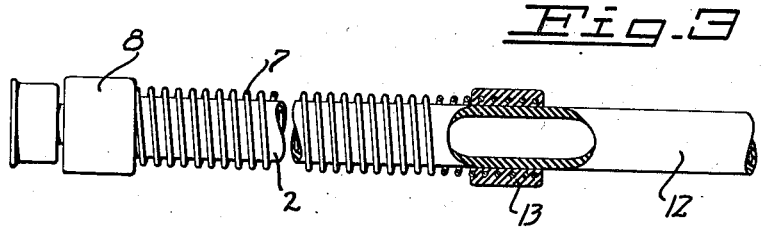
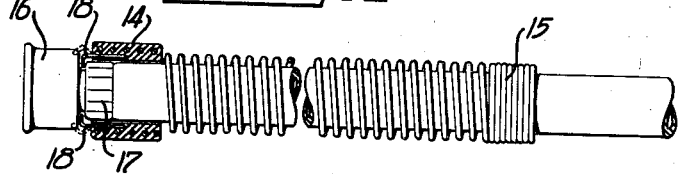
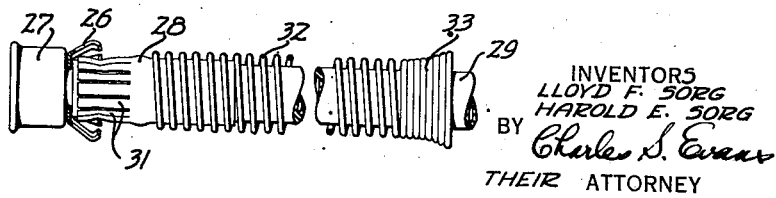
INVENTORS
LLOYD F. SORG
HAROLD E. SORG
BY Charles S. Evans
THEIR ATTORNEY Patented Jan. 2, 1940

2,185,741

UNITED STATES PATENT OFFICE 2,185,741

HOSE ATTACHMENT

Lloyd F. Sorg, San Carlos, and Harold E. Sorg, Berkeley, Calif.

Application July 5, 1938, Serial No. 217,382

4 Claims. (Cl. 138—61)

Our invention relates to a flexible connector for hose; and the broad object of the invention is to provide means for preventing the kinking and breakage of hose at the point where short bending is likely to occur, such as the end where a water hose is connected to a hydrant.

The invention possesses other objects and features of advantage, some of which, with the foregoing, will be set forth in the following description of our invention. It is to be understood that we do not limit ourselves to this disclosure of species of our invention, as we may adopt variant embodiments thereof within the scope of the claims.

Referring to the drawing:

Figure 1 is a side view, partly in section and partly in elevation, showing the hose connector embodying the improvements of our invention, and Figure 2 is a side elevational view showing the connector interposed between an ordinary garden hose and a hydrant.

Figure 3 is a side view, also partly in section and partly in elevation, showing a modified arrangement in which the spring structure is incorporated as a unitary part of a full length hose.

Figures 4 to 8 are similar views showing spring units which may be mounted directly on an ordinary garden hose.

In terms of broad inclusion, our hose attachment comprises a section of hose, preferably formed as a separate piece with hose couplings at each end, so that the section may be connected to provide an extension of an ordinary hose. If desired however, the hose section may comprise an integral part of a full length hose. A coil spring is provided to encircle the hose section, and means are provided for fastening the spring to the section.

In greater detail, and referring to Figures 1 and 2 of the drawing, the hose attachment of our invention as embodied in a separate coupling unit comprises a relatively short section 2 of hose or other flexible tubing, say about nine inches long. When designed as a connector for garden hose the section 2 may be a piece of ordinary rubber hose such as used for gardening purposes. Couplings 3 are provided at the ends of the hose section, and are preferably the usual threaded hose couplings of the type having a ribbed nipple 4 inserted in the hose. The hose section is fastened to the coupling by a suitable clamp, such as a stiff wire ring 6 encircling the hose and clamping the latter against the ribbed nipple.

A coiled wire spring 7 is provided about the hose section and has a length substantially equal to that of the section. The spring is preferably helically wound with spaced convolutions of steel wire suitably plated to resist rust; and the spring preferably has an inside diameter slightly larger than the outside diameter of the hose to provide clearance for freedom of movement between the convolutions of the spring and the hose section.

Means are provided for fastening the spring to the hose section. For this purpose rubber sleeves 8 are moulded about and vulcanized to the end portions of the hose section to provide resilient anchorages in which the ends of the spring are embedded. These rubber sleeves overlie the clamp rings 6 to hide the latter, and have an outside diameter larger than the spring to completely embed the end convolutions of the spring. The integral structure of these sleeves with a rubber hose provides a firm anchorage for the ends of the spring, yet the resiliency of the rubber sleeves gives the desired measure of flexibility to the fastening. By securing the ends only of the spring, the intermediate convolutions of the latter are left free to compress on one side and expand on the other to coact with the bending movements of the hose section.

In the normal use of our garden hose connector, as shown in Figure 2, one end is attached to an ordinary hose 9 and the other end is connected to a hydrant 11. The spring directs the bending in a smooth curve and prevents the hose section from bending too short, and therefore prevents kinking and breakage of the hose. Also, the spring preserves the annular shape of the hose at the point of bending, and thus insures free passage of water at all times.

While the attachment or connector is conveniently made as a separate unit, the structure may be embodied as a part of the hose itself. Thus in Figure 3 we show the section 2 formed as an integral part of a hose 12. In this case the inner spring holding sleeve 13 embraces the body of the hose and is preferably also of rubber moulded as an integral part of the hose.

Figure 4 shows another modification also adapted for mounting directly on the end of a full length hose. Here the spring is held by sleeves 14 and 15 loosely embracing the hose, so that they may be slipped over the end of the hose for assembly before the coupling 16 is applied. The latter may be of the type having an external clamp ring 17 for gripping the hose.

Spring holding sleeves 14 and 15 may be of any suitable moldable material, such as rubber, composition such as Bakelite, or a metal such as lead, in which the ends of the spring are moldably embedded, as shown at 14. The end sleeve 14 is preferably designed to fit snugly on the hose, to give a firm anchorage for this end of the spring. Also, the sleeves may be of any suitable metal, to which the ends of the spring are welded or otherwise fastened; or the sleeves may be formed by closely wound end convolutions of the spring itself as shown at 15. If desired the convolutions at 15 may be united, as by dipping in solder to form a solid sleeve. The unit is preferably held against shifting on the hose by metal fingers 18 embedded in or otherwise secured to the outer sleeve. These fingers are originally formed as shown by dotted lines in Figure 4, and are bent down between the end of the hose and the coupling when the unit is assembled on the hose. In other words, the unit is first slipped over the end of the hose, then the coupling applied, and then the fingers 18 pressed down into place.

Figures 5 and 6 show an important modification of the invention, adapted to coact with the external clincher fingers 26 of an ordinary clincher type coupling 27. In this case a metal sleeve 28 embraces the hose 29 and is slotted at the head end to provide fingers 31 underlying fingers 26 of the coupling. The ends of sleeve fingers 31 are slightly depressed or grooved annularly of the sleeve to form seats for the downturned ends of coupling fingers, thus forming an interlocking engagement. Spring 32 is fastened to the sleeve by suitable means, as by soldering. The opposite or free end of the spring is preferably provided with a sleeve or terminal ring 33 by wrapping two or more of the end convolutions closely together; and these convolutions may be flared out to give a smooth bearing surface for the hose.

In the application of this attachment the spring and sleeve unit is first slipped over the end of the hose, and then coupling 27 slipped on so that its spread fingers overlie the sleeve fingers as shown in Figure 5. The spread fingers are then hammered down in the way such clincher couplings are usually applied. By hammering down the outer fingers, the parts are interlocked, and the underlying fingers are further bent and depressed into the hose. The underlying sleeve also gives a solid support for the clincher fingers of the coupling, and the coupling is less likely to work loose than in the ordinarily applied clincher coupling. Another important feature is that the underlying sleeve prevents the clincher fingers 26 from biting directly into the hose. When the clincher fingers are hammered directly into the hose, as ordinarily applied, the relatively sharp fingers cut and break down the rubber hose structure so that the hose is materially weakened at this point where greatest strength should exist. As a result the hose begins to leak and the couplings work loose and pull off.

Figure 7 shows a further modification comprising a spring holding sleeve 33 formed integrally with a clincher ring 34 of coupling 36. The clincher fingers in this case are formed by lips 37 bent inwardly to grip the hose. A variant spring fastening is also shown here, comprising a helically grooved sleeve upon which the spring 38 is threaded. The end of the sleeve is tapered to expand the spring convolutions as they are threaded on, thus holding the spring firmly.

Figure 8 is a somewhat different arrangement for use with a coupling 39 of the type ordinarily requiring a separate clamp ring about the hose. In this case the coupling clamp is formed as an integral part of the spring holding sleeve 42. The clamp comprises a clamp band 43 partially severed from the sleeve and tensioned against the hose by a bolt 44 passing through a flange on the band and another flange on the main part of the sleeve. Spring 46 is fastened to the sleeve by any suitable means, as by soldering.

In all of the latter forms of our invention it will be seen that the clamp means for holding the spring encircles that part of the hose overlying the inserted nipple of the coupling, so that the nipple gives support for the clamp when the latter is applied.

We claim:
1. The combination with a hose and a coupling, of a coil spring for encircling the hose, and a sleeve fastened to said coupling for holding the spring, said sleeve having clincher fingers integrally formed thereon for clamping engagement with the hose.

2. The combination with a hose and a coupling, of a coil spring for encircling the hose, and a sleeve for holding the spring and having an integral clamp band partially severed therefrom for clamping the sleeve to the hose.

3. The combination with a hose and a coupling having external clincher fingers adapted to be bent down to clamp the coupling to the hose, of a metal sleeve for embracing the hose and having an end slotted axially to provide bendable clincher fingers for gripping the hose and interengageable with said fingers of the coupling when the latter are bent down, and a spring for encircling the hose and fixed to the sleeve at the end opposite said fingers.

4. A hose attachment comprising a metal sleeve for embracing the hose and having an end slotted axially to provide bendable clincher fingers for gripping the hose, and a spring for encircling the hose and fixed to the sleeve at the end opposite said fingers.

LLOYD F. SORG.
HAROLD E. SORG.